(No Model.)

W. W. ATWOOD & W. C. ORCUTT.
SOLE INKING TOOL.

No. 475,377. Patented May 24, 1892.

Witnesses:
Wm Mayer
A. M. Charlot

Inventors:
William W. Atwood + William C. Orcutt
By Smith + Osborn
Attys

UNITED STATES PATENT OFFICE.

WILLIAM W. ATWOOD AND WILLIAM C. ORCUTT, OF SAN FRANCISCO, CALIFORNIA.

SOLE-INKING TOOL.

SPECIFICATION forming part of Letters Patent No. 475,377, dated May 24, 1892.

Application filed June 17, 1891. Serial No. 396,622. (No model.)

*To all whom it may concern:*

Be it known that we, WILLIAM W. ATWOOD and WILLIAM C. ORCUTT, citizens of the United States, residing in the city and county of San Francisco, State of California, have invented certain new and useful Improvements in Tools for Inking Soles of Boots and Shoes, of which the following is a specification.

Our invention has for its object the production of a hand-tool for inking the edges of soles for the manufacture of boots and shoes; and it consists in certain novel parts and combinations of parts producing a hand-tool that by suitable adjustment can be used on square or on chamfered edges, all as hereinafter more fully described.

The nature of our said improvements and the manner in which we have constructed and combined the same to produce a novel tool will be fully understood from the following description and the drawings that accompany and form part of this specification.

Figure 3:
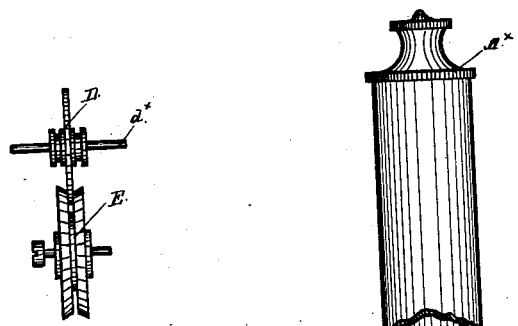
Figure 2:
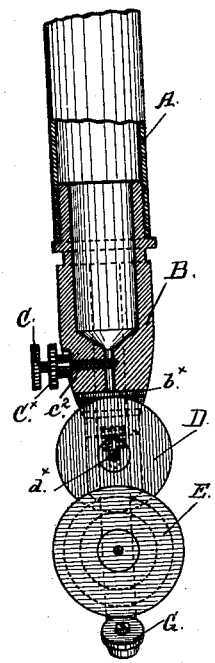
Figure 1:
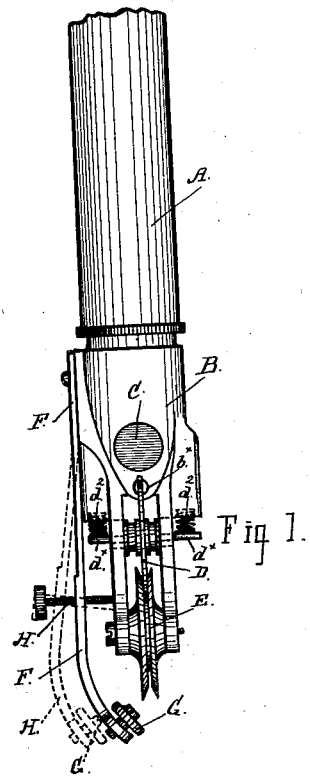

Figure 1 of the drawings is a general view of the complete tool, the handle being broken away. Fig. 2 is a longitudinal section through the nozzle or ink-delivering end. Fig. 3 represents an inking-wheel with a wide face for use on broad flat edges.

The principal parts of the tool consist of a handle with a chamber to hold the ink, a feeding-aperture in one end with a controlling-valve, a feeding-disk running partly in a slit across the aperture, and an inking-wheel mounted under and in line with the feeding-disk and having a slit to take in the edge or periphery of the feeding-disk. In connection with these parts there is a guide-wheel set to run on the bottom of the sole for the purpose of steadying and controlling the tool.

Several forms or styles of inking-wheels adapted to meet different shapes of sole edges are provided for use in the same tool, and separate guide-wheels separately mounted or arranged on detachable arms or bracket-pieces are also furnished for use with different styles of inking-wheels or for special work.

A is a tube forming a reservoir for the ink and the handle of the tool.

$A^\times$ is a screw-cap closing the end where the tube is filled.

B is a tapering nozzle or butt fixed to the end of the tube, with a passage leading through it to the smaller end, where it merges into or terminates in a slit or narrow discharge-aperture $b^\times$, that extends diametrically across the end of the nozzle.

C is a screw set across the ink-passage from the outside in a threaded socket $c^2$ and furnished with a check-nut $C^\times$. The diameter of the screw should be somewhat greater than the bore or passage intersected by it, so that it will cut off the flow of ink when screwed down to its seat. The size of the discharge-aperture through the nozzle is varied by setting the end of the screw a greater or less amount across the passage.

D is a thin disk mounted to run loosely on bearings below the end of the nozzle directly in line with the slit for the greater portion of its rim on the upper side of its axle $d^\times$. The disk is set on spring-bearings $d^2$ to have limited vertical or longitudinal play in the slot.

The inking-wheel E is formed of two parallel disks set apart to take in the edge or rim of the ink-feeding disk, or is made of one piece, with a continuous narrow slit in its periphery. The inner edges of the rim are beveled, or the edge of each disk is dished to produce a V-shaped groove all around the rim of the wheel. The width of this groove across the top or extreme edges determines the width of the band or strips of ink produced by the tool, and therefore several sizes of inking-wheels are furnished with each tool where it is desired to give it the capacity to work on different thicknesses or forms of soles.

The broad-edge inking-wheel illustrated in Fig. 3, for instance, is substituted for the narrower wheel shown in Fig. 1 in adjusting the tool to work on a broad flat edge. Wheels to run on chamfered edges of different thicknesses and of special forms or styles of chamfer can be provided for use with the same tool.

F is an adjustable arm fixed by one end to the handle at one side and having at the outer free end a small traction wheel or roller G. This end of the arm is curved toward the inking-wheel, and the arm itself is made of spring metal.

H is an adjusting-screw set through the arm, with its point bearing against the side of the nozzle for the purpose of regulating the position of the roller G with respect to the inking-wheel. In adjusting the tool to the work this roller is set to bear against and run on the bottom of the sole, and thereby serve both to steady and confine the inking-wheel to the line along which the ink is to be applied. The curvature or shape of the arm can be varied to give the guide-wheel any required position for special work, and, if desired, several arms of different shapes or characters of curves at the wheel-carrying end can be furnished with each tool. The arm can be detached from the tool, also, where the character of work does not call for it, as in inking a narrow sole with a chamfered edge on which the grooved rim of the inking-wheel will fit and run smoothly.

Having thus fully described our invention, what we claim, and desire to secure by Letters Patent, is—

1. The herein-described tool for inking the soles of boots and shoes, consisting of a handle having an ink-reservoir with a nozzle at the end and a slit extending across the passage of said nozzle and intersecting it transversely, a disk mounted for rotation in said slit, an inking-wheel below the disk having a rim or edge with a circumferential slit, into which the edge of the disk is set to run, and a regulating-valve in the passage above the feeding-disk, for operation as set forth.

2. The combination of the ink-reservoir having a nozzle with an ink-discharging passage and a transverse slit extending across the said passage, a feeding-disk rotatable in said slit, an inking-wheel mounted for rotation below said disk, having a grooved or slotted rim to take the disk, and a feed-regulating valve in said passage, substantially as described.

3. The combination, with an ink-reservoir having an ink-discharging passage, of the feeding-disk having its rim setting across and rotatable in the discharge-passage, and an inking-wheel having a circumferential slit or groove to take the edge of the feeding-disk, extending from the bottom outward to an acute edge at the rim all around, the said feeding-disk being rotated by frictional contact with the inking-wheel, substantially as hereinbefore described.

4. In a tool for inking soles of boots and shoes, the inking-wheel having a circumferential slit or groove with beveled inner sides or faces terminating in acute edges at the rim of the wheel, in combination with the ink-feeding disk mounted for rotation partly within an ink-holding chamber or reservoir and adapted to travel in the slit or groove of said wheel, as hereinbefore described.

In testimony that we claim the foregoing we have hereunto set our hands and seals.

WILLIAM W. ATWOOD. [L. S.]
WILLIAM C. ORCUTT. [L. S.]

Witnesses:
C. W. M. SMITH,
CHAS. E. KELLY.